United States Patent [19]

Lee

[11] Patent Number: 5,216,335
[45] Date of Patent: Jun. 1, 1993

[54] CIRCUIT FOR PREVENTING DOMING OF CATHODE RAY TUBE

[75] Inventor: Chan K. Lee, Suweon, Rep. of Korea

[73] Assignee: Samsung Electronics Co., Ltd., Rep. of Korea

[21] Appl. No.: 917,290

[22] Filed: Jul. 23, 1992

[30] Foreign Application Priority Data

Jul. 30, 1991 [KR] Rep. of Korea .................. 91-13116

[51] Int. Cl.[5] ........................................... H01J 29/52
[52] U.S. Cl. .................................... 315/383; 358/168
[58] Field of Search ............... 315/383; 358/168, 219, 358/172, 243

[56] References Cited

U.S. PATENT DOCUMENTS 3,848,945 11/1974 Holzrichter .

FOREIGN PATENT DOCUMENTS 2153681 6/1990 Japan .

*Primary Examiner*—Theodore M. Blum
*Attorney, Agent, or Firm*—Sughrue, Mion, Zinn, Macpeak & Seas

[57] ABSTRACT

A circuit for preventing the doming of the cathode ray tube in color TVs and instruments using high-resolution CRT's is disclosed. In the circuit a collector voltage in a voltage control circuit is gradually decreased using a thermistor with a negative temperature coefficient, and the clipping level for a video signal and a brightness level are gradually increased, thereby increasing the beam current of the CRT slowly, wherein the thermal expansion of the CRT shadow mask gradually occurs, preventing the formation of color stains and speckles on the screen and preventing the degradation of the picture.

5 Claims, 1 Drawing Sheet $$\frac{kR2}{R1+R2} \times Vcc1$$

CIRCUIT FOR PREVENTING DOMING OF CATHODE RAY TUBE

BACKGROUND OF THE INVENTION

The present invention relates to color TVs and displaying instruments using CRT(Cathode Ray Tube) and, more particularly, to a circuit which can prevent the degradation of a screen by minimizing the doming caused by excess beam current at the time of initial operation, where "doming" represents the dome-shaped expansion of a shadow mask by heat.

Generally, since the shadow mask of a CRT is thermally expanded by beam current, it must be well designed to be uniformly expanded from a center to an edge of a screen, in order to minimize the degradation of the screen. But, this is possible only when video signal level is the same over the full screen and the thermal expansion occurs slowly.

In practice, the general video signal level is not identical over the full screen and the average picture level over the full screen is different for every picture. Thus, if the video signal has a continuously high average picture level or locally high average picture level from initial operation after power turns on, the shadow mask of the CRT is non-uniformly expanded, yielding the doming phenomenon. Then, misslanding also occurs so that R(red), G(green), and B(blue) beams from an electron gun are not projected accurately onto R.G and B points, placing a stain on the screen and leading to the disagreement of colors on the screen.

Thus, the picture is seriously damaged. As dot pitch, that is, the distance between the color point and the next same color point is smaller, it becomes more difficult to achieve higher resolution and larger size displays.

SUMMARY OF THE INVENTION

The present invention solves these problems and provides a circuit which prevents the non-uniform expansion of a shadow mask due to initial excess current by limiting the beam current during initial operation, thereby preventing the degradation of the picture.

According to the present invention, there is provided a circuit for preventing the doming of the CRT for a video signal processing circuit, the circuit comprising a voltage control circuit connected to a constant voltage source for generating time delay and control signals, a video signal clipping circuit connected to an input video signal terminal and the voltage control circuit for clipping the video signal when its peak level is above a reference level predetermined by a designer, a brightness control circuit connected to the voltage control circuit for controlling the level of brightness according to control voltages from the voltage control circuit, and a beam current control circuit connected to both the video signal input terminal and a horizontal driving pulse input terminal for preventing excess current by detecting the average picture level of the video signal with continuously integrating the input video signal independent of time and controlling the brightness control circuit according to the detected average picture level.

DETAILED DESCRIPTION OF THE PREFERRED EMBODIMENT

The present invention is described in more detail with reference to the accompanying drawings.

Figure 1:
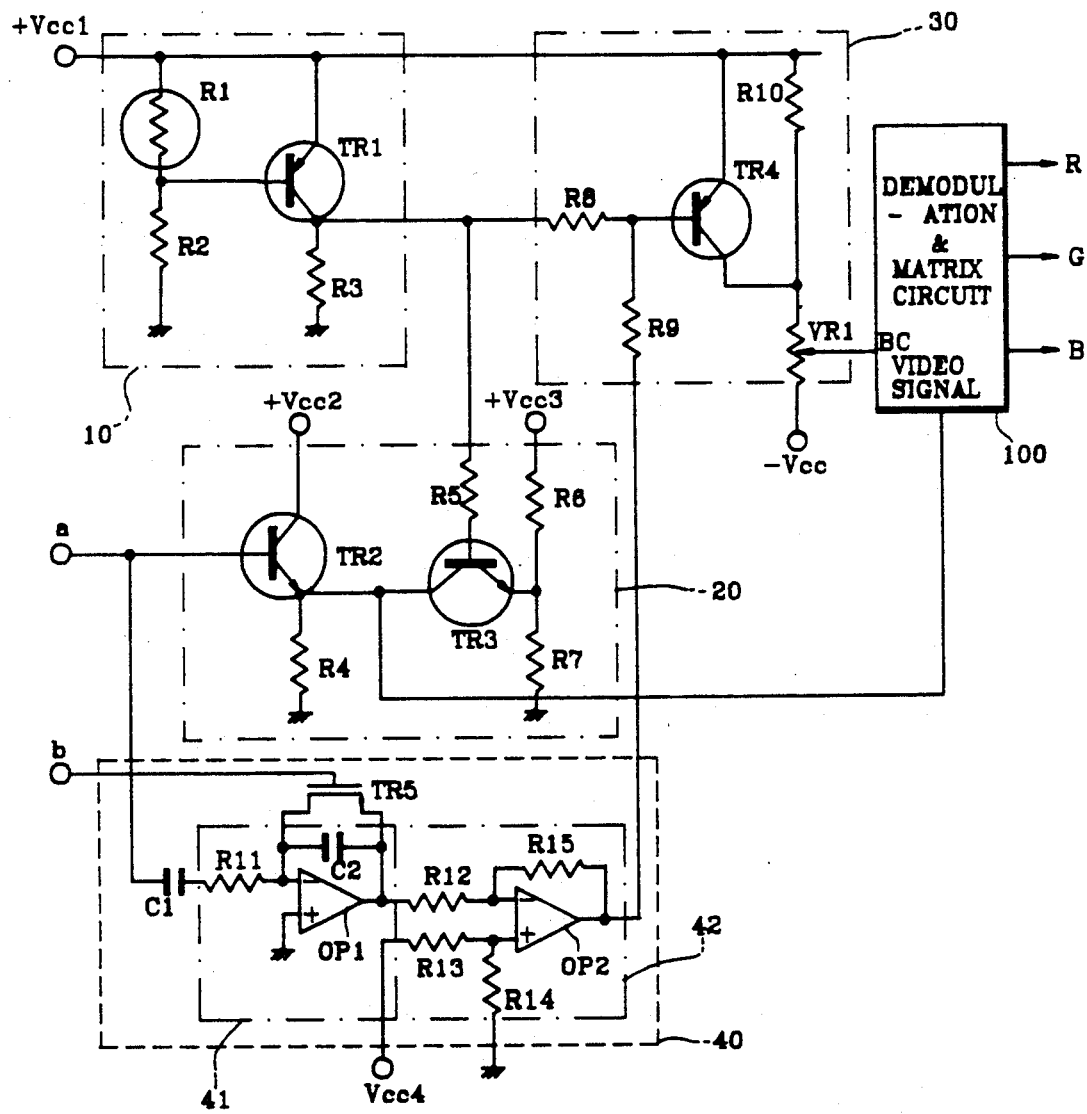
FIG. 1 illustrates a circuit for preventing the doming of a CRT according to the present invention.

FIG. 1 shows a circuit for preventing the doming of a CRT according to the present invention. The circuit includes a voltage control circuit 10, a video signal clipping circuit 20, a brightness control circuit 30 and a beam current control circuit 40.

Video signal clipping circuit 20 for clipping the peak level of an input video signal above a predetermined reference level is connected to both a video signal input terminal a and voltage control circuit 10 for generating the time delay and control voltages at the time of turn-on of the power supply.

The voltage control circuit 10 comprises a thermistor R1 whose resistance value increases in inverse proportion to heat, a voltage dividing resistor R2, a load resistor R3, and a transistor TR1 with a base connected to the thermistor R1 and to the voltage dividing resistor R2, an emitter connected to a power supply $V_{CC1}$, and a collector connected to the load resistor R3. As time passes, a value of the thermistor R1 is varied by heat, controlling the voltage at the collector of TR1.

The video signal clipping circuit 20 comprises a load resistor R4, a switching transistor TR2, having a base connected to a video signal input terminal, a collector connected to a power supply $V_{CC2}$ and an emitter connected to the load resistor R4, two resistors R6 and R7 for establishing a reference level of the video signal, and a transistor TR3 for clipping peak levels of the video signals according to a voltage applied from the voltage control circuit 10 when the level of the video signal is above the reference level established by the resistors R6 and R7. An emitter of the transistor TR3 is connected to the resistors R6 and R7, while the base and the collector thereof are connected to a biasing resistor R5 and the emitter of the transistor TR2, respectively.

Meanwhile, a brightness control circuit 30 is connected to the voltage control circuit 10 for controlling the brightness of the video signal according to the control voltage from the voltage control circuit 10.

The brightness control circuit 30 comprises a biasing resistor R8 connected to the voltage control circuit 10, a resistor R10 and a variable resistor VR1 for establishing the brightness level, and a switching transistor for controlling the brightness according to the control voltage from the voltage control circuit 10. The base of the transistor TR4 is connected to the biasing resistor R8, while the emitter is connected to the power supply $V_{CC1}$. A center terminal of the variable resistor VR1 is connected to a brightness control port of a demodulation and matrix circuit 100 which demodulates and combines input video signals applied from the video signal clipping circuit 20 for providing R,G, and B signals.

Also, a beam current control circuit 40 is connected to both a video signal input terminal (a) and a horizontal driving pulse input terminal (b) for continuously detecting the average picture level of the video signal independent of time by integrating the video signal to prevent the excess beam current.

The beam current control circuit 40 integrates the video signal, to obtain its DC component, i.e., the average picture level, by using a coupling capacitor C1 connected to the input video signal terminal (a) and an integrator 41. The integrator 41 includes a resistor 11 a capacitor C2, and an operational amplifier OP1. Also, a gate of a field effect transistor (FET) is used to discharge the capacitor C2 during the horizontal blanking cycle in a period of 1H (1 horizontal scanning time) in response to the horizontal driving pulse input of terminal (b).

Gain controller 42 comprises two resistors R13 and R14 for establishing the reference voltage level, gain adjusting resistors R12 and R15, and an operational amplifier OP2 having an inverting terminal (−) connected to a resistor R12 and a non-inverting terminal (+) connected to resistors R13 and R14. An output of the operational amplifier OP2 is connected to the base of the transistor TR4 through the resistor R9.

The operation of the invention is described below in detail with reference to a preferred embodiment, where a voltage $V_B$ is applied from the power supply $V_{CC1}$ to the transistor TR1 when the displaying means is powered on. The voltage $V_B$ is as follows;

$$V_B = \frac{R2}{R1 + R2} \times V_{cc1} \quad (1)$$

Figure 2:
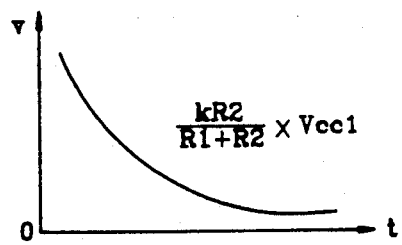
FIG. 2 is a graph showing the relation between time delay and the voltage of the voltage control circuit in FIG. 1.

The resistor R1 has a negative temperature coefficient. Thus, the resistance value of R1 is increased in inverse proportion to heat, increasing the base voltage of the transistor TR1. Then, the emitter current of the transistor TR1 is gradually decreased, lowering the collector voltage, as shown in FIG. 2. In order words, the collector voltage of the transistor TR1 is initially high, turning on the transistor TR3 through the resistor R5. At this time, the video signal applied to the base of the transistor TR2 is clipped when its level is higher than the reference level predetermined by the resistor R6 and R7.

To explain this in more detail, when the power supply is turned on, the transistor TR1 operates in the saturation region since the collector voltage of the transistor TR1 is high enough to turn on the transistor TR3, where the emitter voltage $V_E$ of the transistor TR3 becomes $$V_E = \frac{R7}{R6 + R7} \times V_{CC3} \quad (2)$$

Thus, if the peak level of the video signal at the emitter of the transistor TR2 is higher than the predetermined level, the current flows to ground through the transistor TR3 and the resistor R7 the clip the peak level of the video signal above the predetermined level set by the resistors R6 and R7. After that, as time passes, the collector voltage of the transistor TR1 decreases, entering the normal mode. Then, the transistor TR3 enters the cut off region and the video signal is no longer clipped.

Meanwhile, the high collector voltage of the transistor TR1 is also applied to the base of the transistor TR4 through the resistor R8. Thus, the transistor TR4 turns off and the brightness level establishing voltage applied to the demodulation and matrix circuit 100 is decreased.

At the same time, after the integrator 41 integrates the video signal for detecting its average picture level, the gain controller 42 controls the gain according to the detected average picture level in the beam current control circuit. If the average picture level of the video signal is high, the output from the operational amplifier OP2 becomes high so that the transistor TR4 is turned off and excess beam current does not flow through the CRT. But, if the average picture level of the video signal is low, the transistor TR4 is turned on independently of the collector voltage of the transistor TR1 so as to increase the brightness level. The field effect transistor TR5 discharges the capacitor C2 every horizontal blanking cycle for a period of 1H.

In the meantime, since the output voltages from the voltage control circuit 10 and the beam control circuit 40 are added to each other and applied to the base of the transistor TR4, although the video signal of low level is applied when the power supply is turned on, the picture is not degraded.

The collector voltage Vc of the transistor TR1 is decreased as shown in FIG. 2, after turning-on the power supply, by $$V_c = \frac{kR2}{R1 + R2} \times V_{CC1} \quad (3)$$

where k is a constant depending on the characteristics of the thermistor R1. The time until the collector voltage of the transistor TR1 becomes sufficiently low can be adjusted by a current flowing through the thermistor R1, adequately for the CRT used.

According to the decrease of the collector voltage of the transistor TR1, the clipping level of the video signal predetermined by the clipping circuit 20 is gradually increased. Thus, the beam current of the CRT is also increased gradually and the thermal expansion of the shadow mask occurs slowly.

Further, the beam current control circuit 40 detects the average picture level of the video signal independent of time and controls the brightness level according to the detected average picture level, thereby preventing the excess beam current.

On the other hand, a sufficient time passes, the transistor TR1 is completely conductive, while the transistor TR3 is completely cut off, making the circuit operate in normal mode.

The present invention can accomplish the time delay function using the voltage control circuit, a microcomputer or a counter, and can restrict the video signal clipping circuit 20 according to the zone of screen. In addition, the beam current control circuit 40 according to the present invention can be used to protect the CRT of conventional color TVs.

As described hereinabove, the present invention can prevent the doming phenomenon by gradually increasing the beam current of the CRT at the time of initial turn-on of the power supply, and by making the thermal expansion of the CRT shadow mask gradual, thereby removing color stain and speckles from the screen.

What is claimed is:
1. A circuit for preventing doming of a cathode ray tube in a video signal processing circuit, comprising:
   a voltage control circuit;
   a video signal clipping circuit connected to an input video signal terminal and said voltage control circuit for clipping the video signal when its peak level is above a predetermined reference level;
   a brightness control circuit connected to said voltage control circuit for controlling level of brightness according to a control voltage from said voltage control circuit; and a beam current control circuit connected to both said video signal input terminal and to a horizontal driving pulse input terminal for preventing excess beam current by detecting an average picture level of said video signal by continuously integrating the input video signals and controlling said brightness control circuit according to the detected average picture level.

2. The circuit according to claim 1, wherein said voltage control circuit comprises a thermistor having a resistance value which increases in inverse proportion to heat, a voltage dividing resistor, a load resistor, and a transistor having a base connected to said thermistor and to said voltage dividing resistor, and an emitter connected to a constant voltage source and a collector connected to said load resistor an output voltage from said transistor being controlled as time elapses.

3. The circuit according to claim 1, wherein said video signal clipping circuit comprises a switching transistor having a base connected to said video signal input terminal and a collector connected to a constant voltage source, said transistor being turned on when a video signal enters through said video signal input terminal, a load resistor connected to said switching transistor, two resistors connected to said power supply for establishing a reference level of the video signal, and a transistor having an emitter connected to said resistors for clipping the peak level of the video signal according to a voltage applied from said voltage control circuit when the level of the video signal is above the reference level established by said resistors.

4. The circuit according to claim 1, wherein said brightness control circuit comprises a switching transistor having a base connected to a biasing resistor and an emitter connected to a constant voltage source for controlling the brightness according to control voltages from said voltage control circuit, and a resistor and a variable resistor connected to said switching transistor and said constant voltage source for establishing the brightness level.

5. The circuit according to claim 1, wherein said beam current control circuit comprises a coupling capacitor connected to said video signal input terminal, an integrator connected to the coupling capacitor for detecting the average picture level by integrating said input video signal, a field effect transistor with a gate connected to said horizontal driving pulse input terminal for discharging the capacitor during a horizontal blanking cycle in a period of 1 horizontal scanning time, and a gain controller connected to said integrator for raising the brightness level by controlling a gain when the average picture level is low.

* * * * *